United States Patent
Hell et al.

(10) Patent No.: US 7,422,765 B2
(45) Date of Patent: *Sep. 9, 2008

(54) BINDERLESS STORAGE PHOSPHOR SCREEN WITH NEEDLE SHAPED CRYSTALS

(75) Inventors: Erich Hell, Erlangen (DE); Manfred Fuchs, Nürnberg (DE); Detlef Mattern, Erlangen (DE); Bernhard Schmitt, Erlangen (DE); Paul Leblans, Kontich (BE)

(73) Assignee: Agfa-Gevaert, N.V., Mortsel (BG)

( * ) Notice: Subject to any disclaimer, the term of this patent is extended or adjusted under 35 U.S.C. 154(b) by 0 days.

This patent is subject to a terminal disclaimer.

(21) Appl. No.: 10/331,764

(22) Filed: Dec. 31, 2002

(65) Prior Publication Data

US 2003/0091729 A1    May 15, 2003

Related U.S. Application Data

(62) Division of application No. 09/745,796, filed on Dec. 26, 2000, now abandoned.

(60) Provisional application No. 60/211,927, filed on Jun. 16, 2000.

(30) Foreign Application Priority Data

Dec. 27, 1999  (DE)  ................................. 199 63 182
May 24, 2000  (EP)  .................................. 00201857

(51) Int. Cl.
    *B05D 5/06*  (2006.01)
(52) U.S. Cl. .......................... 427/65; 427/69; 427/374.2
(58) Field of Classification Search ................... 427/64, 427/65, 69, 70, 374.2
    See application file for complete search history.

(56) References Cited

U.S. PATENT DOCUMENTS

| | | | | |
|---|---|---|---|---|
| 4,896,043 | A * | 1/1990 | Arakawa et al. | 250/484.4 |
| 5,028,509 | A * | 7/1991 | Shimada et al. | 430/139 |
| 5,427,817 | A * | 6/1995 | Goodman et al. | 427/65 |
| 5,904,781 | A * | 5/1999 | Goodman et al. | 118/726 |
| 6,031,236 | A * | 2/2000 | Arakawa et al. | 250/484.4 |
| 6,479,835 | B1 * | 11/2002 | Struye et al. | 250/584 |
| 6,495,850 | B1 | 12/2002 | Struye et al. | |
| 6,501,088 | B1 | 12/2002 | Struye et al. | |
| 6,504,169 | B1 * | 1/2003 | Leblans et al. | 250/588 |
| 6,512,240 | B1 * | 1/2003 | Leblans et al. | 250/588 |
| 6,528,812 | B1 | 3/2003 | Leblans et al. | |
| 6,572,986 | B2 * | 6/2003 | Ogawa et al. | 428/690 |
| 6,802,991 | B2 * | 10/2004 | Devenney et al. | 252/301.4 H |

* cited by examiner

*Primary Examiner*—Timothy Meeks
*Assistant Examiner*—James Lin
(74) *Attorney, Agent, or Firm*—Breiner & Breiner, LLC (57) ABSTRACT

A binderless storage phosphor screen with needle shaped crystals, wherein the phosphor is an alkalihalide phosphor and the needles show high [100] unit cell orientation in the plane of the screen.

9 Claims, 7 Drawing Sheets

BINDERLESS STORAGE PHOSPHOR SCREEN WITH NEEDLE SHAPED CRYSTALS

The present application is a division of application Ser. No. 09/745,796 filed Dec. 26, 2000, now abandoned, and claims benefit under 35 U.S.C. §119(e) of provisional application Ser. No. 60/211,927 field Jun. 16, 2000.

FIELD OF THE INVENTION

The present invention relates to a binderless storage phosphor screen with needle shaped phosphors.

BACKGROUND OF THE INVENTION

A well known use of storage phosphors is in the production of X-ray images. In U.S. Pat. No. 3,859,527 a method for producing X-ray images with a photostimulable phosphor, which are incorporated in a panel is disclosed. The panel is exposed to incident pattern-wise modulated X-ray beam and as a result thereof the phosphor temporarily stores energy contained in the X-ray radiation pattern. At some interval after the exposure, a beam of visible or infra-red light scans the panel to stimulate the release of stored energy as light that is detected and converted to sequential electrical signals which (are) be processed to produce a visible image. For this purpose, the phosphor should store as much as possible of the incident X-ray energy and emit as little as possible of the stored energy until stimulated by the scanning beam. This is called "digital radiography" or "computed radiography".

The image quality that is produced by any radiographic system using a phosphor screen thus also by a digital radiographic system, depends largely on the construction of the phosphor screen. Generally, the thinner a phosphor screen at a given amount of absorption of X-rays, the better the image quality will be. This means that the lower the ratio of binder to phosphor of a phosphor screen, the better the image quality, attainable with that screen, will be. Optimum sharpness can thus be obtained when screens without any binder are used. Such screens can be produced, e.g., by physical vapour deposition, which may be thermal vapour deposition, sputtering, electron beam deposition or other of phosphor material on a substrate. However, this production method can not be used to produce high quality screens with every arbitrary phosphor available. The mentioned production method leads to the best results when phosphor crystals with high crystal symmetry and simple chemical composition are used.

The use of alkali metal halide phosphors in storage screens or panels is well known in the art of storage phosphor radiology and the high crystal symmetry of these phosphors makes it possible to provide structured screens and binderless screens.

It has been disclosed that when binderless screens with an alkali halide phosphors are produced it is beneficial to have the phosphor crystal deposited as some kind of piles, needles, tiles, etc. In, e.g., U.S. Pat. No. 4,769,549 it is disclosed that the image quality of a binderless phosphor screen can be improved when the phosphor layer has a block structure shaped in fine pillars. In e.g. U.S. Pat. No. 5,055,681 a storage phosphor screen comprising an alkali halide phosphor in a pile-like structure is disclosed. The image quality of such screens needs still to be increased and in JP-A-06/230 198 it is disclosed that the surface of the screen with pillar like phosphors is rough and that a leveling of that surface can increase the sharpness. In U.S. Pat. No. 5,874,744 the attention is drawn to the index of refractivity of the phosphor used to produce the storage phosphor screen with needle-like of pillar-like phosphor.

Although all screens disclosed in this prior art can yield X-ray images with good quality, the need for a better compromise between speed of the recording system (i.e. as low as possible patient dose) with an image with high sharpness and low noise is still there.

OBJECTS AND SUMMARY OF THE INVENTION

It is an object of the invention to provide a stimulable phosphor screen useful in an X-ray recording system with a very good compromise between speed of the recording system (i.e. as low as possible patient dose) with an image with high sharpness and low noise.

The above mentioned object is realized by providing a stimulable phosphor screen having the specific features defined in claim 1. Specific features for preferred embodiments of the invention are disclosed in the dependent claims.

Further advantages and embodiments of the present invention will become apparent from the following description and drawings.

DETAILED DESCRIPTION OF THE INVENTION

It has now been found that it is possible to improve a binderless phosphor screen comprising an alkali halide phosphor by producing it in such a manner that the phosphor is present on the support as needle-like crystals having a specific crystal orientation. It has been found that, when a phosphor screen showing high [100] unit cell orientation in the plane of the screen was produced, that such a screen shows a better compromise between speed and sharpness. The phosphor screens showing high (100) unit cell orientation in the plane of said screen are characterized by an XRD-spectrum wherein the intensity of the (100) diffraction line is at least equal to the intensity of the (110) diffraction line, when said XRD-spectrum is measured by positioning an X-ray source and an X-ray diffraction intensity detector at equal but varying angles with respect to the normal to said screen. Preferably the intensity of the (100) diffraction line is at least 5 times higher than the intensity of the (110) diffraction line and most preferably the intensity of the (100) diffraction line is at least 10? times higher than the intensity of the (110) diffraction line.

To realize such a crystal orientation on the screen the binderless phosphor layer is applied to the support a by method selected from the group consisting of physical vapour deposition, thermal vapour deposition, chemical vapour deposition, electron beam deposition, radio frequency deposition and pulsed laser deposition. In fact any of the methods above for preparing the binderless phosphor screen is suitable as long as the parameters of the method can be adjusted so that the requirements of the crystallinity of the phosphor needles as described herein above are met. Preferably the binderless phosphor screen is prepared by vacuum deposition under an inert gas atmosphere. It was found that by adjusting the temperature of the substrate and the pressure of the inert gas during vacuum deposition, the crystal orientation of the needles could be adjusted to the desired level.

The inert gas that is used during vapour deposition is preferably Ar. The temperature of the gas stream that enters the vacuum deposition apparatus is kept between 0° C. and 100° C. Preferably the gas stream is kept at room temperature, i.e., between about 20° C. and about 30° C. The cool gas stream entering the vacuum deposition apparatus can cool both the vapour before it is deposited as well as the substrate. It is preferred to keep said substrate at a temperature, T, so that 50° C.≦T≦300 C., preferably 90° C.≦T≦≦200° C. The Ar-pressure is at most 10 Pa, preferably kept between 1 Pa and 3 Pa, both limits included. In a more preferred embodiment the Ar-pressure is kept between 0.20 and 2.00 Pa and the temperature is adjusted so that the product between temperature in degrees Celsius between 20 and 350, both limits included.

It was found that when a phosphor screen was prepared under the circumstances set out above not only the crystal orientation of the needles could be adjusted to the desired level, but also the macroscopic dimensions of the needles could be influenced: when a method described above was used, very thin needles were obtained. This was especially so when the rate of vapour deposition of the phosphor or phosphor precursors was above 1 mg/cm²min.

Figure 7:
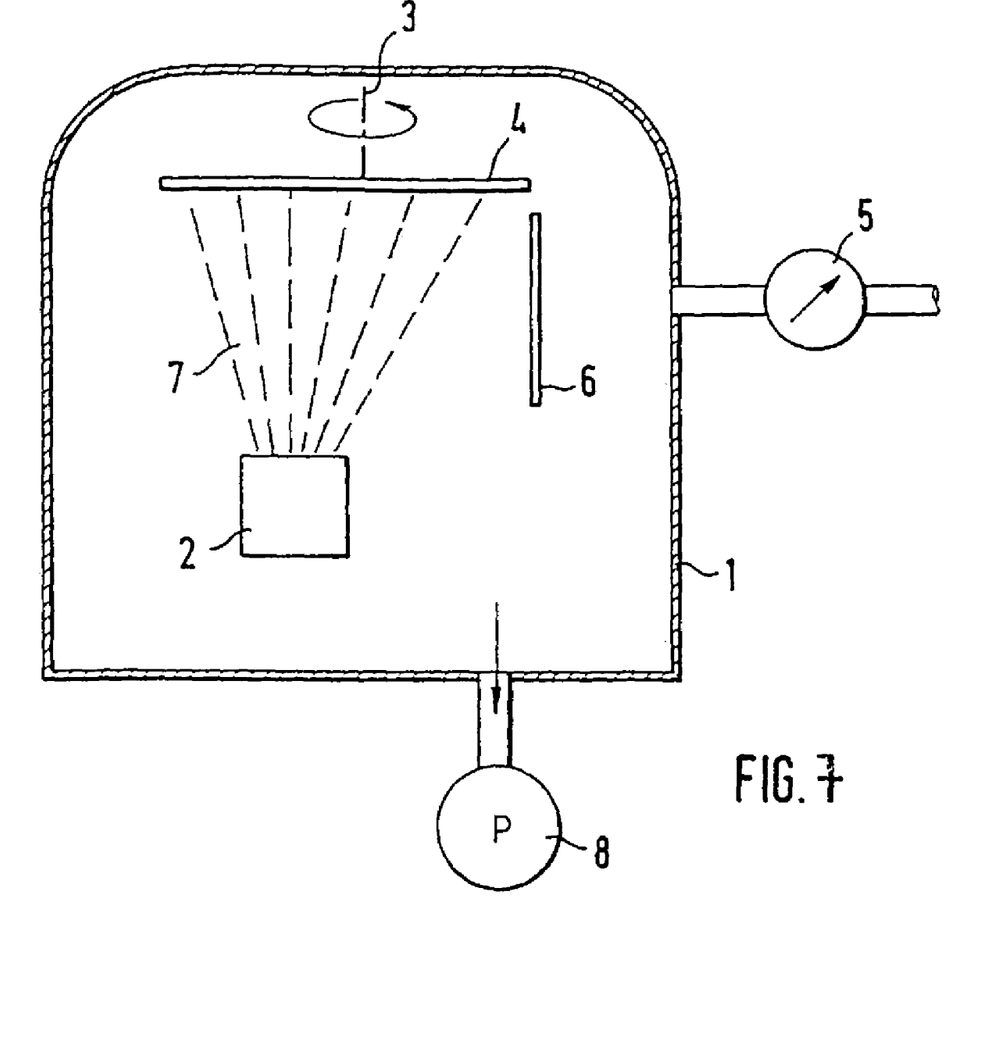
FIG. 7 shows a schematic view of a vapour deposition apparatus useful for producing a binderless storage phosphor screen.

FIG. 7 shows a schematic view of a vapour deposition apparatus useful for producing a binderless storage phosphor screen comprising an alkali metal storage phosphor said screen showing an XRD-spectrum with a (100) diffraction line having an intensity $I_{100}$ and a (110) diffraction line having an intensity $I_{110}$, so that $I_{100}/I_{110} \geq 1$, when said XRD-spectrum is measured according to TEST A. Such apparatus comprises a vacuum vessel (1) in which a vapour deposition source (2) is arranged opposite the substrate (4), which preferably rotates about an axis (3). An inert gas, such as argon, which is very much cooler than the vapour temperature of, typically, 650 to 700° C., for example being at room temperature, can be introduced into the vacuum vessel (1) via a regulating valve (5); the inert gas preferably firstly impinges on a baffle plate (6) and is not introduced directly into the vapour jet (7). The inert gas is evacuated up again via a vacuum pump (8), the vacuum pump is set such that a pressure of less than 10 Pa, preferably between 1 Pa and 3 Pa, is produced within the vacuum vessel (1). If so desired, when the cool gas stream is not sufficient for cooling of the substrate, it is possible to couple the substrate (4) to an external cooling device (not shown).

A binderless phosphor screen according to this invention can be prepared by vacuum deposition of the phosphor crystals on the substrate as well as by combining (mixing) the ingredients for the phosphor (phosphor precursors) and then evaporating this mixture so as to have the phosphor formed in situ during evaporation.

The phosphor in a binderless phosphor screen according to this invention can be any alkali metal phosphor known in the art. Suitable phosphors are, e.g., phosphors according to formula I:

$$M^{1+}X.aM^{2+}X'_2BM^{3+}X''_3 : cZ$$

wherein: $M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leq a \leq 1$, $0 \leq b \leq 1$ and $0 < c \leq 0.2$. Such phosphors have been disclosed in, e.g., U.S. Pat. No. 5,736,069.

Highly preferred phosphors for use in a binderless phosphor screen of this invention are CsX:Eu stimulable phosphors, wherein X represents a halide selected from the group consisting of Br and Cl prepared by a method comprising the steps of:
  mixing said CsX with between $10^{-3}$ and 5 mol % of an Europium compound selected from the group consisting of $EuX'_2$, $EuX'_3$ and $EuOX'$, X' being a member selected from the group consisting of F, Cl, Br and I,
  firing said mixture at a temperature above 450° C.
  cooling said mixture and
  recovering the CsX:Eu phosphor.

Most preferably a CsBr:Eu stimulable phosphor, is used prepared by a method comprising the steps of:
  mixing said CsX with between $10^{-3}$ and 5 mol % of an Europium compound selected from the group consisting of $EuX'_2$, $EuX'_3$ and $EuOX'$, X' being a member selected from the group consisting of F, Cl, Br and I,
  firing said mixture at a temperature above 450° C.
  cooling said mixture and
  recovering the CsX:Eu phosphor.

The binderless screen can be prepared by bringing the finished phosphor on the support by any method selected from the group consisting of (physical vapour deposition is de verzamelnaam voor thermal vapour deposition, electron beam vapour deposition, sputtering, . . . ), thermal vapour deposition, chemical vapour deposition, electron beam deposition, radio frequency deposition and pulsed laser deposition. It is also possible to bring the alkali metal halide and the dopant together and depositing them both on the support in such a way that the alkali metal phosphor is doped during the manufacture of the screen. Thus the invention encompasses a method for manufacturing a phosphor screen containing a CsX:Eu stimulable phosphor, wherein X represents a halide selected from the group consisting of Br and Cl comprising the steps of:
  bringing multiple containers of said CsX and an Europium compound selected from the group consisting of $EuX'_2$, $EuX'_3$ and $EuOX'$, X' being a halide selected from the group consisting of F, Cl, Br and I in condition for vapour deposition and
  depositing, by a method selected from the group consisting of, thermal vapour deposition, chemical vapour deposition, electron beam deposition, radio frequency deposition and pulsed laser deposition, both said CsX and said Europium compound on a substrate in such a ratio that on said substrate a CsX phosphor, doped with between $10^{-3}$ and 5 mol % of Europium, is formed.

The deposition can proceed from a single container containing a mixture of the starting compounds in the desired proportions. Thus the method encompasses further a method for manufacturing a phosphor screen containing a CsX:Eu stimulable phosphor, wherein X represents a halide selected from the group consisting of Br and Cl comprising the steps of:
  mixing said CsX with between $10^{-3}$ and 5 mol % of an Europium compound selected from the group consisting of $EuX'_2$, $EuX'_3$ and $EuOX'$, X' being a halide selected from the group consisting of F, Cl, Br and I bringing said mixture in condition for vapour deposition and depositing said mixture on a substrate by a method selected from the group consisting of physical vapour deposition, thermal vapour deposition, chemical vapour deposition, electron beam deposition, radio frequency deposition and pulsed laser deposition.

Support materials useful for binderless storage screens having a phosphor layer with a crystal orientation as per this invention include cardboard, glass, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A glass or Al-sheet or a thermostable plastic film is preferably employed as the support material.

When a glass support is used the support may comprise a coated layer with a light absorbing compound. This layer can be present on the back side (side where no phosphor is present) or may be present underneath the phosphor. The supports can also comprise subbing layers for having a better adhesion between the phosphor and the support.

The support, when it is a thermostable plastic film may contain a light-absorbing material such as carbon black, or may contain a light-reflecting material such as titanium dioxide or barium sulphate. The former is appropriate for preparing a high-resolution type storage screen, while the latter is appropriate for preparing a high-sensitivity type storage screen.

These supports may have a thickness which may differ depending on the material of the support, and may generally be between 60 μm and 10,000 μm, more preferably between 80 μm and 5,000 μm from the standpoint of handling.

EXAMPLES

Preparation of the Phosphor

CsBr:Eu screens were made via thermal vapour deposition of CsBr and EuOBr. To this aim, CsBr was mixed with EuOBr and placed in a container in a vacuum deposition chamber. The phosphor was deposited on a glass disk with a thickness of 1.5 mm and a diameter of 40 mm. The distance between the container and the substrate was 10 cm. During evaporation, the substrate was rotated at 12 rpm. The container with starting materials was heated to a temperature of 750° C.

Before the start of the evaporation, the chamber was evacuated to a pressure of $4.10^{-5}$ mbar. During the evaporation process, Ar was introduced in the chamber.

Variables in the deposition process were the substrate temperature and the Ar gas pressure. The different screens were produced under the conditions listed in Table 1. The Eu-concentration in the evaporated screens was measured with X-ray fluorescence and was of the order of 800 ppm.

Via Scanning Electron Microscopy (SEM), the morphology of the deposited phosphor layer was determined. All phosphor layers were made up of needle shaped crystals.

Figure 1:
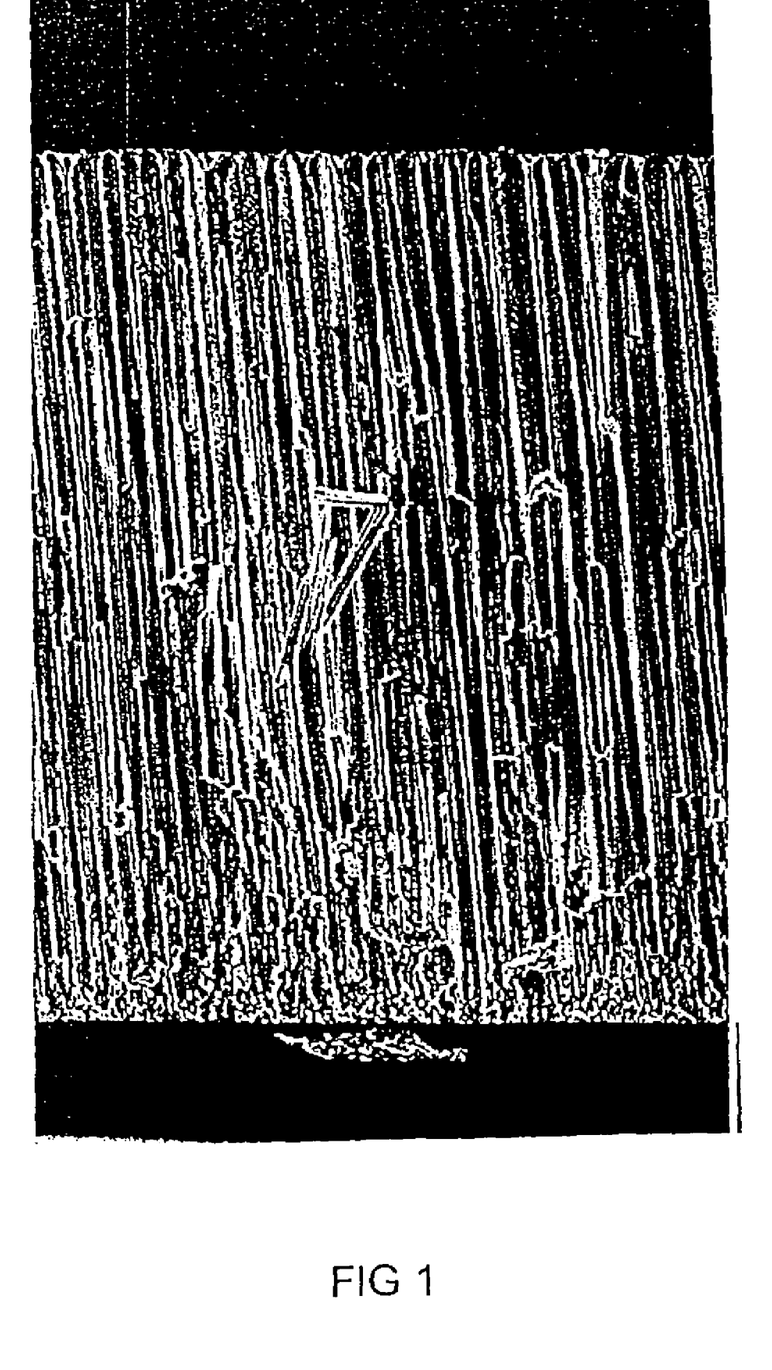
FIG. 1 shows a SEM photograph of a phosphor screen with needle-shaped phosphor.

FIG. 1 shows a SEM view of an example phosphor layer taken perpendicular on an edge of the phosphor layer. It is clear that a needle like structure is present.

TABLE 1

Substrate temperature and Ar gas pressure at the different screen depositions

| Screen | Substrate temperature (° C.) | Ar pressure (Pa) |
|---|---|---|
| Comparative example 1 | 130 | 3.2 |
| Invention Example 1 | 150 | 2.2 |
| Invention Example 2 | 150 | 1.1 |
| Invention Example 3 | 300 | 0 |
| Invention Example 4 | 92 | 2.4 |

Measurement of Crystal Orientation: TEST A

Figure 2:
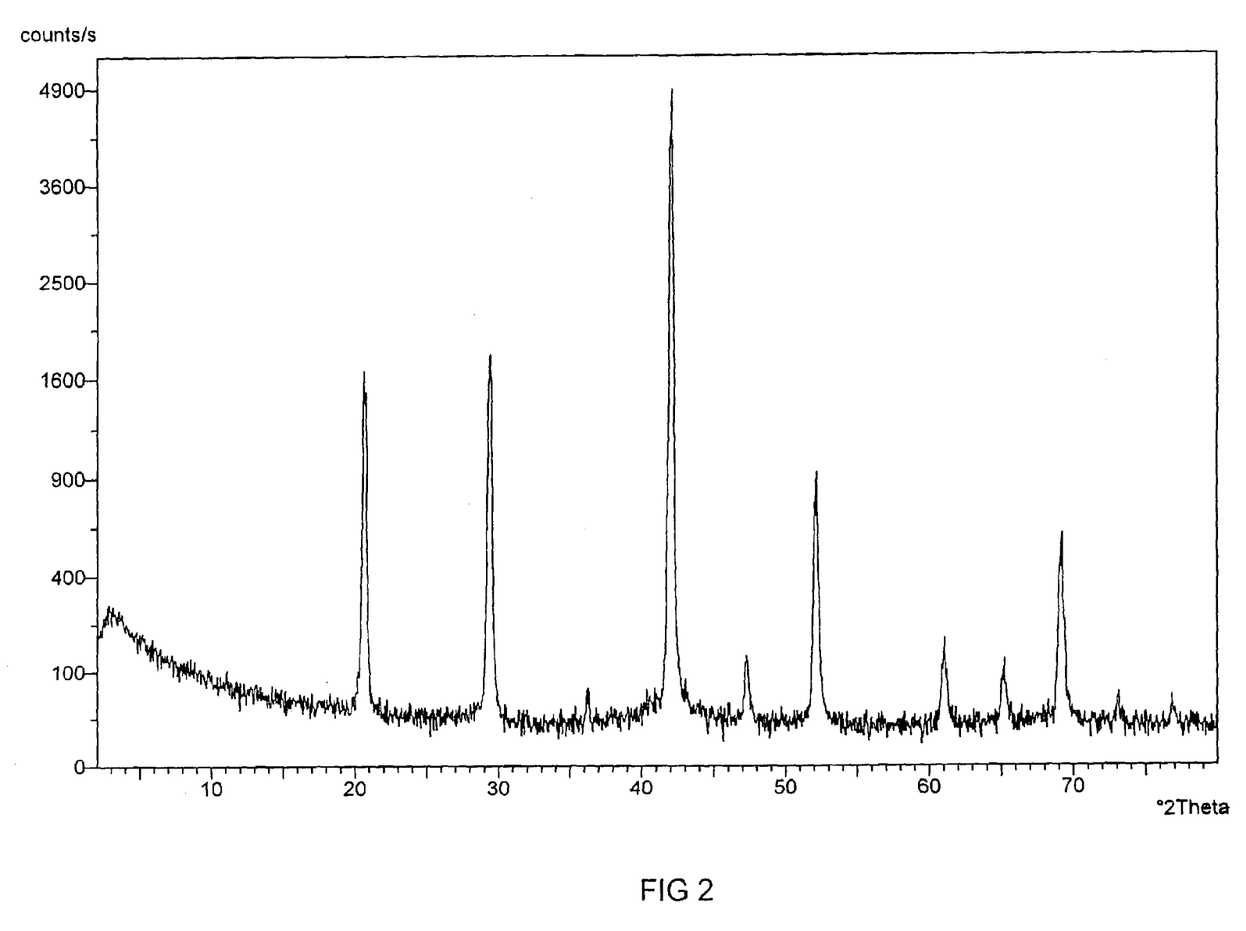
FIG. 2 shows an XRD-spectrum of a screen with a comparative needle-shaped phosphor.
Figure 3:
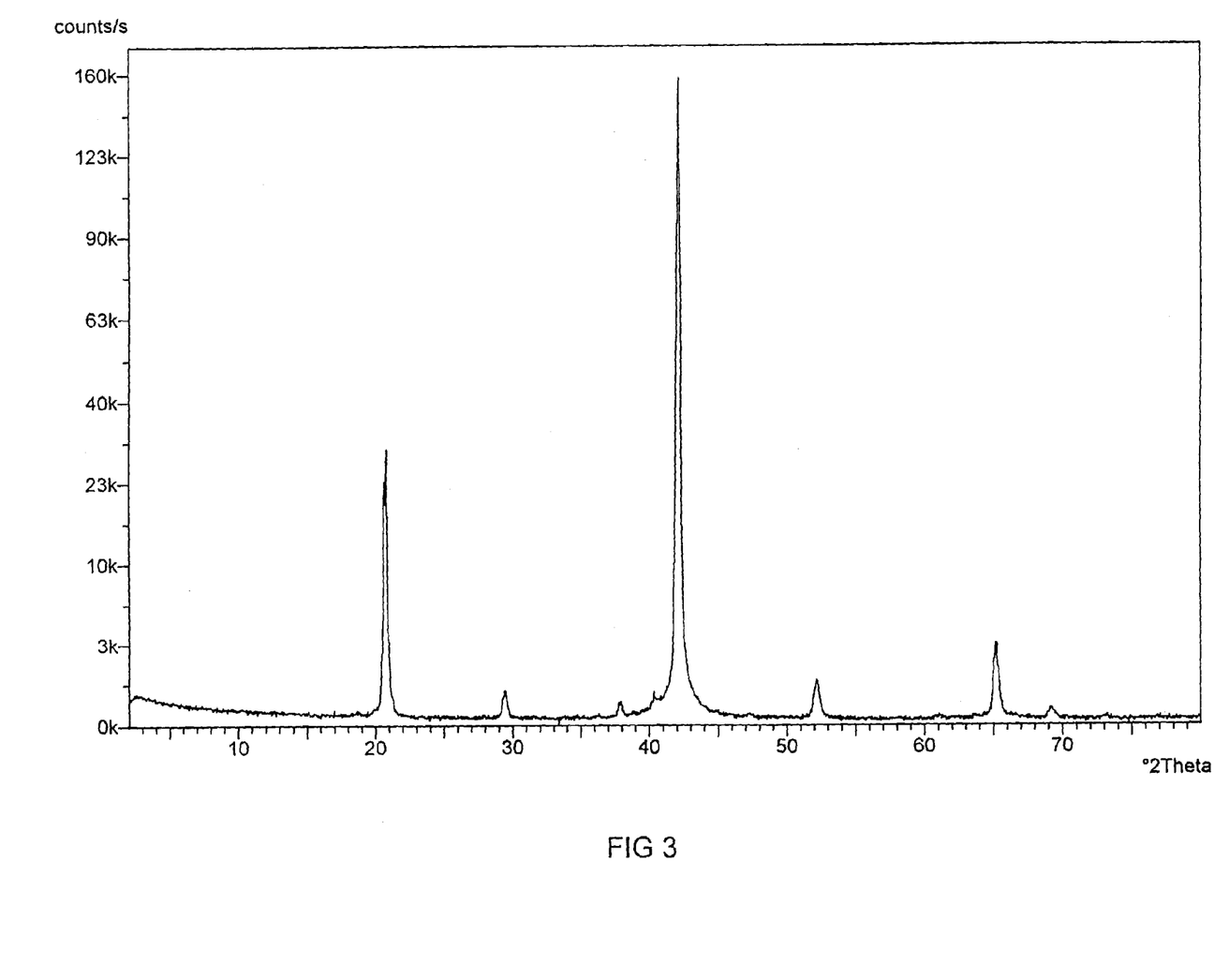
FIGS. 3 - 6 show XRD spectra of screens with invention needle-shaped phosphors.
Figure 4:
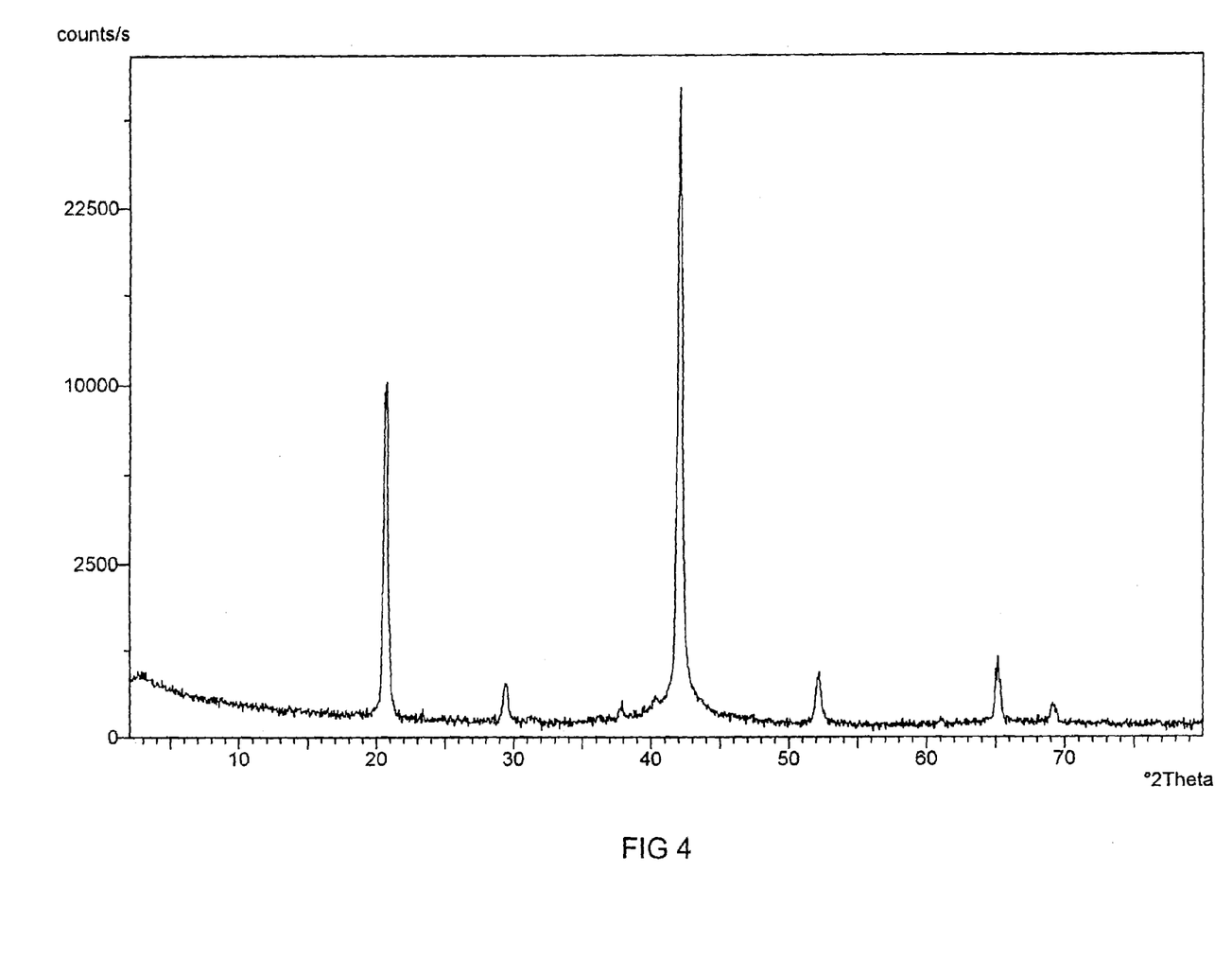
Figure 5:
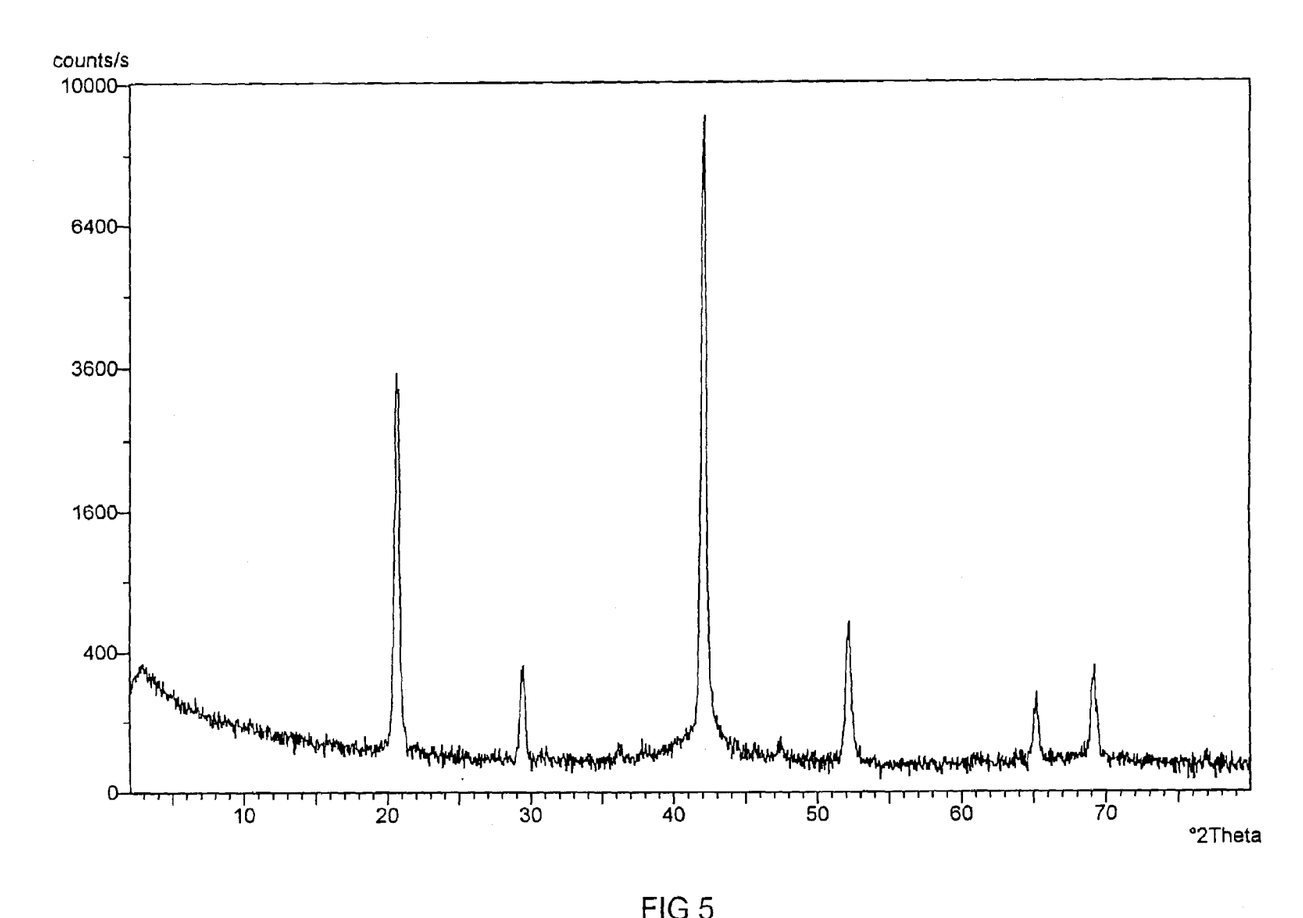
Figure 6:
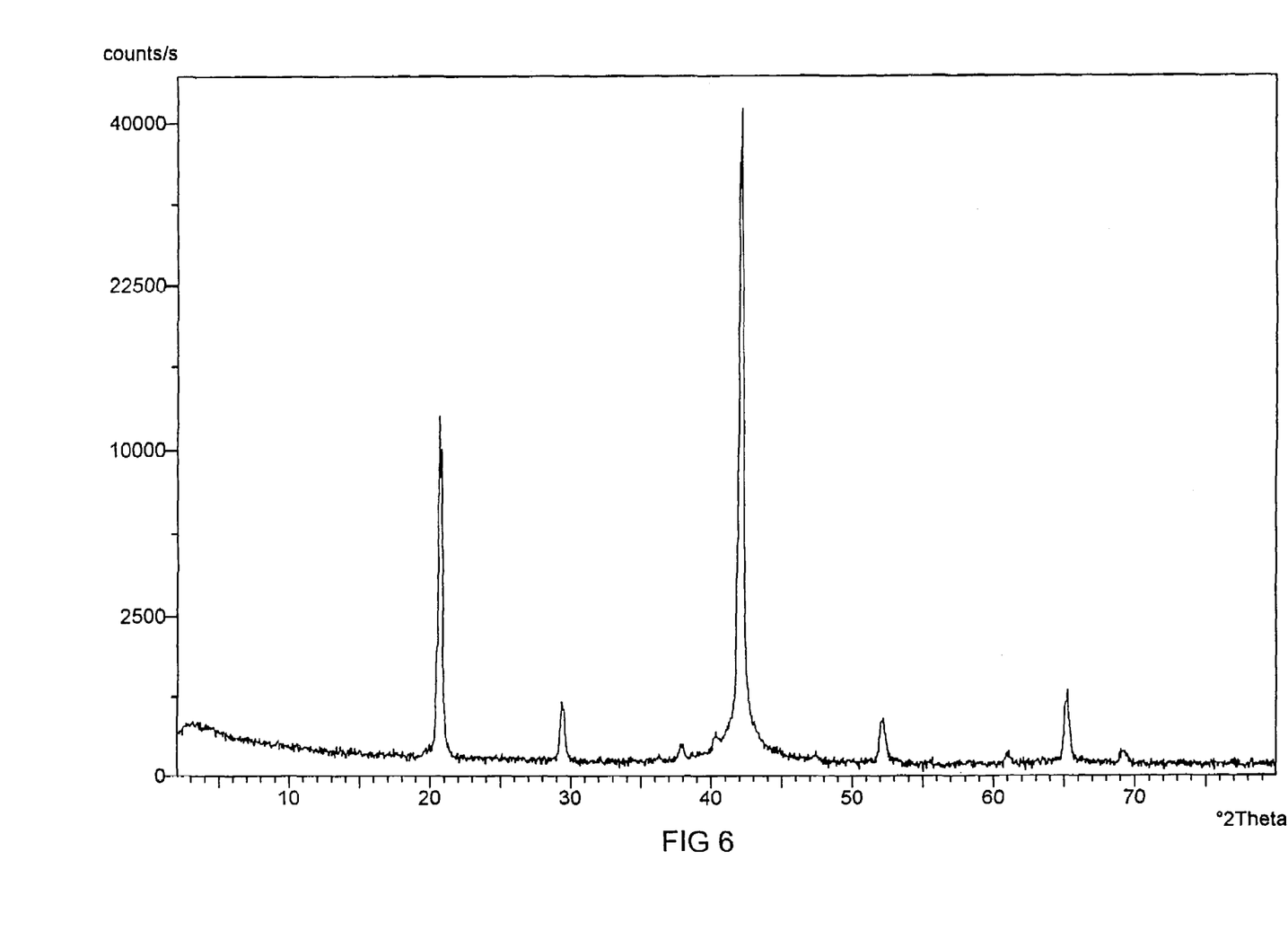

The orientation of the crystal unit cell in the deposited needle shaped crystal has been determined through measurement of the XRD spectrum. XRD spectra have been measured with the commercially available diffractometer. The diffractometer was a Philips X'pert with a MPPS (Multiple Purpose Sampling Stage) and a Cu tube emitting a Kα-line of 0.154056 nm. The spectra were taken and analyzed with the commercial software coming with the diffractometer. The settings and measurement parameters of the measurement were as follows (TEST A):

Settings
    40 kV en 50 mA
    Incident beam: Divergence slit: fixed ⅛°
    Incident beam: Anti scatter slit: fixed ¼°
    Incident beam: Fixed beam mask: 10 mm Measurement
    Start 2θ: 2.00° parameters
    End 2θ: 80.00°
    Step size: 0.05°
    Time per step: 0.60s
    Secondary beam path: lower
    Scan axis: 2θ
    Scan mode: continuous
    Total time: 15min36s
    Gonio angle: 2.0°
    Spinning: no FIG. 2 shows the XRD spectrum comparative example 1. A fairly strong [100] diffraction line is shown at 2θ of about 21° and an evenly strong [110] diffraction line is shown at 2θ of about 29°, also a strong [200] diffraction line is shown at 2θ of about 42°.

FIGS. 3 to 6 show the XRD-spectra of respectively invention example 1, 2, 3 and 4. In these spectra the [110] diffraction line at 2θ of about 29° is barely visible, while the [100] diffraction line at 2θ of about 21° and the [200] diffraction line at 2θ of about 42° remain very strong.

For each of the screens, the ratio between the intensity of the [100] peak in the XRD-spectrum and the [110] peak was calculated. The results are given in table 2

TABLE 2

| Screen | Ratio [100]/[110] |
|---|---|
| Comparative example 1 | 0.79 |
| Invention Example 1 | 54.71 |
| Invention Example 2 | 52.65 |
| Invention Example 3 | 12.16 |
| Invention Example 4 | 14.05 |

Sensitivity and Sharpness Measurements

In a first measurement the sensitivity (speed) of the phosphor screens, prepared under the conditions given in Table 1 was measured.

The screens were homogeneously irradiated with a dose of ca. 50 mR at 80 kVp. Read out was done in a flying spot scanner. In the scanner, the scanning light source was a 30 mW diode laser emitting at 690 nm. A 4-mm BG-39 (trade name of Hoya) filter was used to separate the stimulation light from the screen emission light. The scan-average levels (SAL's) were determined as the average signal produced by the screens in the photomultiplier tube.

In a second measurement, the sharpness of the images, produced by the screens was measured. As a measure for the sharpness, the square wave response at 2 lp/mm was determined.

A grid with line pairs at spatial frequencies of 0.025 to 3 lp/mm was placed on top of the cassette, containing the screens. The grid was imaged at 80 kVp and 5 mA during 30". The screens were scanned with the flying spot scanner described above. The signal modulation was determined at 0.025 lp/mm and at 2 lp/mm. The SWR at 2 lp/mm was calculated as the ratio of the signal modulation at 2 lp/mm to the signal modulation at 0.025 lp/mm. The results of the measurements are listed in Table 3. Wherein the speed of the comparative example screen is arbitrary set to 100.

TABLE 3

| Screen | Speed (arbitrary units | SWR at 2 lp/mm |
| --- | --- | --- |
| Comparative example 1 | 100 | 0.50 |
| Invention Example 1 | 186 | 0.56 |
| Invention Example 2 | 214 | 0.59 |
| Invention Example 3 | 102 | 0.66 |
| Invention Example 4 | 156 | 0.53 |

It can be concluded that the comparative example 1 screen with less developed (100) unit cell orientation, has inferior quality with respect to the invention examples 1 -4 with almost perfect (100) unit cell orientation. It is possible to adjust the orientation of the crystal to choose a desired speed/sharpness compromise by using the temperature of the substrate during the vacuum deposition and the pressure of the inert gas as parameters.

The invention claimed is:

1. Method for producing a binderless CsBr:Eu storage phosphor screen comprising steps of:
   combining CsBr and EuOBr as phosphor precursors for an alkali metal storage phosphor; and
   vacuum depositing said combination of phosphor precursors on a substrate, wherein during said step of vacuum depositing said substrate is kept at a temperature T, such that $50°\,C. \leq T \leq 300°\,C.$ and said vacuum deposition proceeds in an Ar-atmosphere with an Ar-pressure of at most 3 Pa; and
   wherein said storage phosphor screen shows an XRD-spectrum with a (100) diffraction line having an intensity $I_{100}$ and a (110) diffraction line having an intensity $I_{110}$, so that $I_{100}/I_{110} \geq 1$, when said XRD-spectrum is measured according to TEST A.

2. A method according to claim 1, wherein said temperature of said substrate T is such that $90°\,C. \leq T \leq 200°\,C.$ 3. The method according to claim 1, wherein said combining phosphor precursors for an alkali metal storage phosphor comprises:
   preparing a mixture by combining CsBr with between $10^{-3}$ and 5 mol % of EuOBr,
   firing said mixture at a temperature above 450° C.,
   cooling said mixture, and
   recovering the CsBr:Eu phosphor from said mixture.

4. The method according to claim 1, wherein said method of making said screen further comprises:
   said CsBr is combined with between $10^{-3}$ and 5 mol % of said EuOBr to provide a mixture, and
   bringing said mixture into condition for vapor deposition.

5. A method of making a binderless CsBr:Eu storage phosphor screen comprising an alkali metal storage phosphor wherein said screen shows an XRD-spectrum with a (100) diffraction line having an intensity $I_{100}$ and a (110) diffraction line having an intensity $I_{110}$, so that $I_{100}/I_{110} \geq 1$, when said XRD-spectrum is measured according to TEST A, said method comprising applying binderless phosphor to a support by a method selected from the group consisting of physical vapor deposition, thermal vapor deposition, chemical vapor deposition, electron beam deposition, radio frequency deposition, and pulsed laser deposition; wherein said CsBr:Eu phosphor is made by:
   preparing a mixture by combining CsBr with between $10^{-3}$ and 5 mol % of EuOBr,
   firing said mixture at a temperature above 450° C.,
   cooling said mixture, and
   recovering the CsBr:Eu phosphor from said mixture;
   wherein the binderless phosphor is vacuum deposited in an inert gas atmosphere of argon gas at a pressure of less than 3.0 Pa, and a support temperature of from 50° C. to 300° C.

6. A method according to claim 5, wherein $I_{100}/I_{110} \geq 5$.

7. A method of making a binderless CsBr:Eu storage phosphor screen comprising an alkali metal storage phosphor wherein said screen shows an XRD-spectrum with a (100) diffraction line having an intensity $I_{100}$ and a (110) diffraction line having an intensity $I_{110}$, so that $I_{100}/I_{110} \geq 1$, when said XRD-spectrum is measured according to TEST A, said method comprising applying binderless phosphor to a support by a method selected from the group consisting of physical vapor deposition, thermal vapor deposition, chemical vapor deposition, electron beam deposition, radio frequency deposition, and pulsed laser deposition;
   wherein the binderless phosphor is vacuum deposited in an inert gas atmosphere of argon gas at a pressure of less than 3.0 Pa, and a support temperature of more than 90° C. and up to 200° C., wherein said method of making said screen further comprises:
   preparing a mixture by combining CsBr with between $10^{-3}$ and 5 mol % of EuOBr,
   bringing said mixture into condition for vapor deposition, and
   depositing said mixture on said support.

8. A method of making a binderless CsBr:Eu storage phosphor screen comprising an alkali metal storage phosphor wherein said screen shows an XRD-spectrum with a (100) diffraction line having an intensity $I_{100}$ and a (110) diffraction line having an intensity $I_{110}$, so that $I_{100}/I_{110} \geq 5$, when said XRD-spectrum is measured according to TEST A, said method comprising applying binderless phosphor to a support by a method selected from the group consisting of physical vapor deposition, thermal vapor deposition, chemical vapor deposition, electron beam deposition, radio frequency deposition, and pulsed laser deposition;
   wherein the binderless phosphor is vacuum deposited in an inert gas atmosphere of argon gas at a pressure of less than 3.0 Pa, and a support temperature of more than 90°

C. and up to 200° C.; and wherein said CsBr:Eu phosphor is made by a method comprising:

preparing a mixture by combining CsBr with between $10^{-3}$ and 5 mol % of EuOBr, firing said mixture at a temperature above 450° C., cooling said mixture, and recovering said CsBr:Eu phosphor from said mixture.

9. A method of making a binderless CsBr:Eu storage phosphor screen comprising an alkali metal storage phosphor wherein said screen shows an XRD-spectrum with a (100) diffraction line having an intensity $I_{100}$ and a (110) diffraction line having an intensity $I_{110}$, so that $I_{100}/I_{110} \geqq 5$, when said XRD-spectrum is measured according to TEST A, said method comprising applying binderless phosphor to a support by a method selected from the group consisting of physical vapor deposition, thermal vapor deposition, chemical vapor deposition, electron beam deposition, radio frequency deposition, and pulsed laser deposition;

wherein the binderless phosphor is vacuum deposited in an inert gas atmosphere of argon gas at a pressure of less than 3.0 Pa, and a support temperature of more than 90° C. and up to 200° C.; and wherein said method of making said screen further comprises:

preparing a mixture by combining CsBr with between $10^{-3}$ and 5 mol % of EuOBr, bringing said mixture into condition for vapor deposition, and depositing said mixture on said support.

* * * * *